US007867069B2

(12) United States Patent
Gagliardi

(10) Patent No.: US 7,867,069 B2
(45) Date of Patent: *Jan. 11, 2011

(54) METHOD OF CUTTING BEEF CHUCK ROLL AND BEEF PRODUCTS PRODUCED BY THE METHOD

(75) Inventor: Eugene D. Gagliardi, Cochranville, PA (US)

(73) Assignee: Skippack Creek Corporation, Wilmington, DE (US)

(*) Notice: Subject to any disclaimer, the term of this patent is extended or adjusted under 35 U.S.C. 154(b) by 142 days.

This patent is subject to a terminal disclaimer.

(21) Appl. No.: 12/255,263

(22) Filed: Oct. 21, 2008

(65) Prior Publication Data

US 2009/0117244 A1 May 7, 2009

Related U.S. Application Data

(60) Provisional application No. 61/001,465, filed on Nov. 1, 2007.

(51) Int. Cl.
*A22B 5/00* (2006.01)
(52) U.S. Cl. ...................................... 452/198

(58) Field of Classification Search ............... 452/198; 426/641, 644, 241, 243, 296, 438, 518, 512, 426/513, 104, 643, 76
See application file for complete search history.

(56) References Cited

U.S. PATENT DOCUMENTS

| 4,072,763 | A | * | 2/1978 | Mart ........................ 426/513 |
| 4,258,068 | A | * | 3/1981 | Huffman ................... 426/272 |
| 4,377,597 | A | * | 3/1983 | Shapiro et al. ............... 426/92 |
| 4,539,210 | A | * | 9/1985 | O'Connell et al. ........... 426/56 |
| 4,728,524 | A | * | 3/1988 | Gagliardi, Jr. ............. 426/272 |
| 4,874,623 | A | * | 10/1989 | Matthews et al. .......... 426/272 |
| 5,932,278 | A | * | 8/1999 | Gagliardi, Jr. ............. 426/644 |
| 5,951,392 | A | * | 9/1999 | Gagliardi .................. 452/125 |
| 7,150,678 | B2 | | 12/2006 | Lobel |

* cited by examiner

*Primary Examiner*—Thomas Price
(74) *Attorney, Agent, or Firm*—Sheridan Ross P.C.

(57) ABSTRACT

A method of cutting a beef chuck roll to provide a plurality of higher value beef products includes the steps of: cutting the chuck roll along at least three cut lines to separate the chuck roll into four primary muscles, a first or eye muscle, a second or rhomboideus muscle, a third or splenius muscle and a fourth or serratus ventralis muscle; and trimming each of the four primary muscles to remove excess fat, seams, silver and other undesirable components. Some of the primary muscles are tenderized and marketed as boneless chuck roast products. Some of the primary muscles are cut across the grain into boneless chuck steaks.

12 Claims, 17 Drawing Sheets

PRIOR — ART

PRIOR — ART

FIG. 15
FIG. 16

US 7,867,069 B2

METHOD OF CUTTING BEEF CHUCK ROLL AND BEEF PRODUCTS PRODUCED BY THE METHOD

CROSS REFERENCE TO RELATED APPLICATIONS

This application claims the benefit of priority from U.S. Provisional Patent Application No. 61/001,465 filed Nov. 1, 2007 and entitled "Method of Cutting Beef Chuck Roll and Beef Products Produced by the Method", the entire subject matter of which is incorporated herein by reference.

BACKGROUND OF THE INVENTION

The present invention relates to a method of cutting a beef chuck roll and, more particularly, to a method of cutting a beef chuck roll to create new beef products in a manner that increases the overall per-pound value of the beef chuck roll.

Beef chuck rolls have been sold in substantially the same manner for many years. Typically a portion of the beef chuck roll away from the neck may be cut across the grain with a predetermined thickness to create steaks and the remainder of the chuck roll is either used for a pot roast, cut up for beef cubes or is ground into ground chuck or other low value products. As a result the yield or price per pound obtained from the beef chuck roll is unacceptably low.

The present invention comprises a new method of cutting a beef chuck roll by first separating the principal chuck roll muscles from each other and then further separately processing each of the separated muscles into the below described higher value beef products which substantially increase the overall price per pound obtainable for the beef chuck roll. Because the method used in the present invention includes the removal of almost all of the fat, silver and other undesirable components of the beef chuck roll, the resulting beef products are low in fat, high in protein and almost completely edible, resulting in little or no waste as well as the increased overall price per pound for the chuck roll.

BRIEF SUMMARY OF THE INVENTION

Briefly stated, the present invention comprises a method of cutting a beef chuck roll to provide a plurality of higher value beef products. The method comprises the steps of: cutting the chuck roll along at least three cut lines to separate the chuck roll into four primary muscles, a first or eye muscle, a second or rhomboideus muscle, a third or splenius muscle and a fourth or serratus ventralis muscle; trimming each of the four primary muscles to remove excess fat, seams, silver and other undesirable components; cutting the eye muscle into first and second portions, the second portion being marketed as a boneless chuck eye roast product; cutting the first portion of the eye muscle along a plurality of generally parallel spaced apart cut lines extending generally across the grain of the first portion to form a plurality of low fat, boneless chuck eye steaks; marketing the rhomboideus and splenius muscles as boneless roast products; and cutting the serratus ventralis muscle along a plurality of generally parallel spaced apart cut lines extending generally across the grain of the serratus ventralis muscle to form a plurality of low fat, boneless chuck steaks.

BRIEF DESCRIPTION OF THE SEVERAL VIEWS OF THE DRAWINGS

The following detailed description of the invention will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings:

FIG. 15 is a top perspective view of the removed untrimmed fourth primary muscle;

FIG. 16 is a top perspective view of the fourth primary muscle after trimming in accordance with the present method;

DETAILED DESCRIPTION OF THE INVENTION

Figure 1:
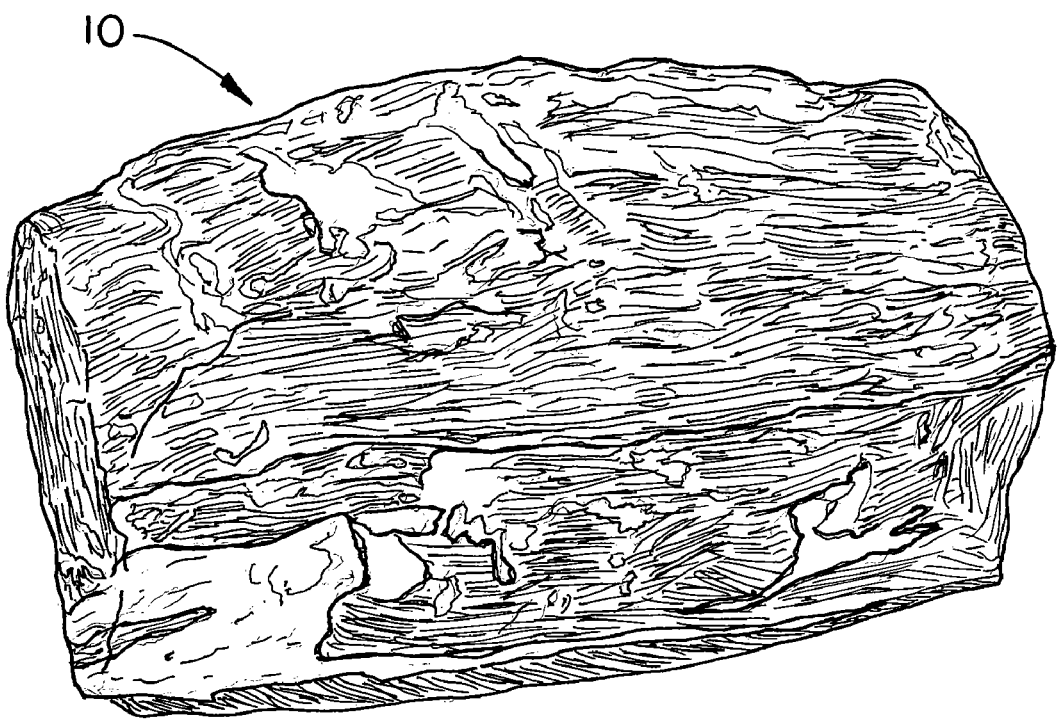
FIG. 1 is a top perspective view of an untrimmed beef chuck roll in accordance with the prior art.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the beef chuck roll and beef products in accordance with the present invention, and designated parts thereof. Unless specifically set forth herein, the terms "a", "an" and "the" are not limited to one element but instead should be read as meaning "at least one". The terminology includes the words noted above, derivatives thereof and words of similar import.

Figure 2:
FIG. 2 is a bottom perspective view of the untrimmed chuck roll shown in FIG. 1.

Referring to the drawings, where the same reference numerals are used for the same components throughout the several Figures, the present invention comprises a method of cutting a beef chuck roll 10 in a new and different manner to obtain several new beef products which may be marketed at a higher per pound price than the price of a conventional chuck roll. FIGS. 1 and 2 show a typical conventional (prior art) untrimmed beef chuck roll 10 of the type well known in the art. As shown in FIGS. 1 and 2, the entire chuck roll 10 has been removed in the usual known manner from the rest of the beef for further processing. The chuck roll 10 is comprised of four primary muscles (best seen individually in FIG. 6) namely a first or chuck eye muscle 12, a second or rhomboideus muscle 14, a third or splenius muscle 16 and a fourth or serratus ventralis muscle 18 along with the usual fat, seams, silver, and other less desirable components present in a typical chuck roll 10. Typically, in the prior art, a chuck roll 10 was cut into either beef cubes or a chuck (pot) roast, or both, was ground into ground chuck or was otherwise made into other relatively low value beef products (not shown) or some combination thereof.

The present invention comprises a new and different way of cutting a chuck roll 10 to provide new lower fat, high protein, boneless, higher value beef products with substantially less low value products such as ground chuck. Essentially the present invention comprises a series of steps for initially separating the four primary muscles 12, 14, 16 and 18 of the chuck roll 10 from each other and then separately processing each of the individual muscles in a prescribed manner to increase the overall value of the chuck roll 10.

Figure 3:
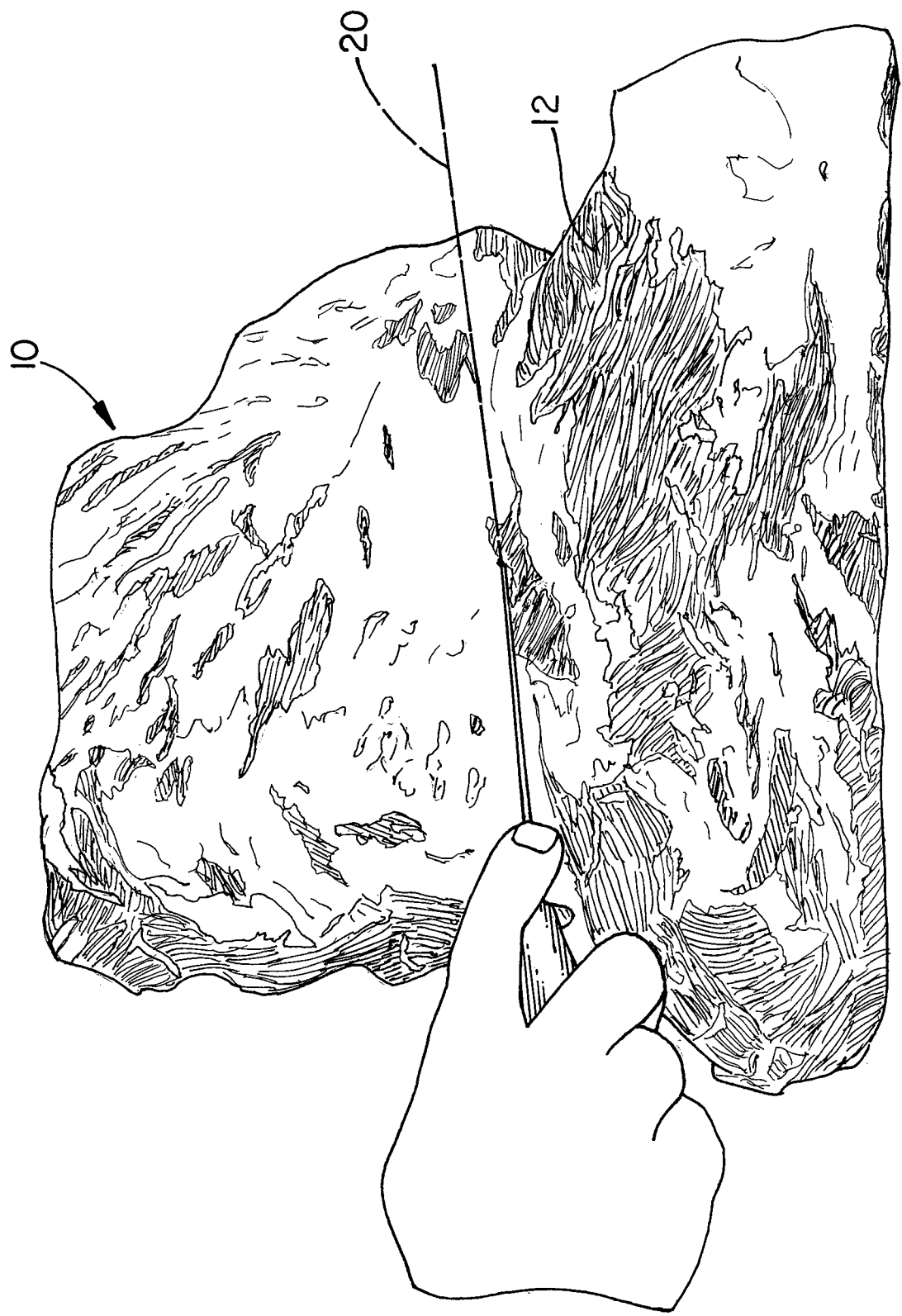
FIG. 3 is a top perspective view of the chuck roll shown in FIG. 1 illustrating a first step in cutting the chuck roll to remove a first primary muscle in accordance with the present method.
Figure 6:
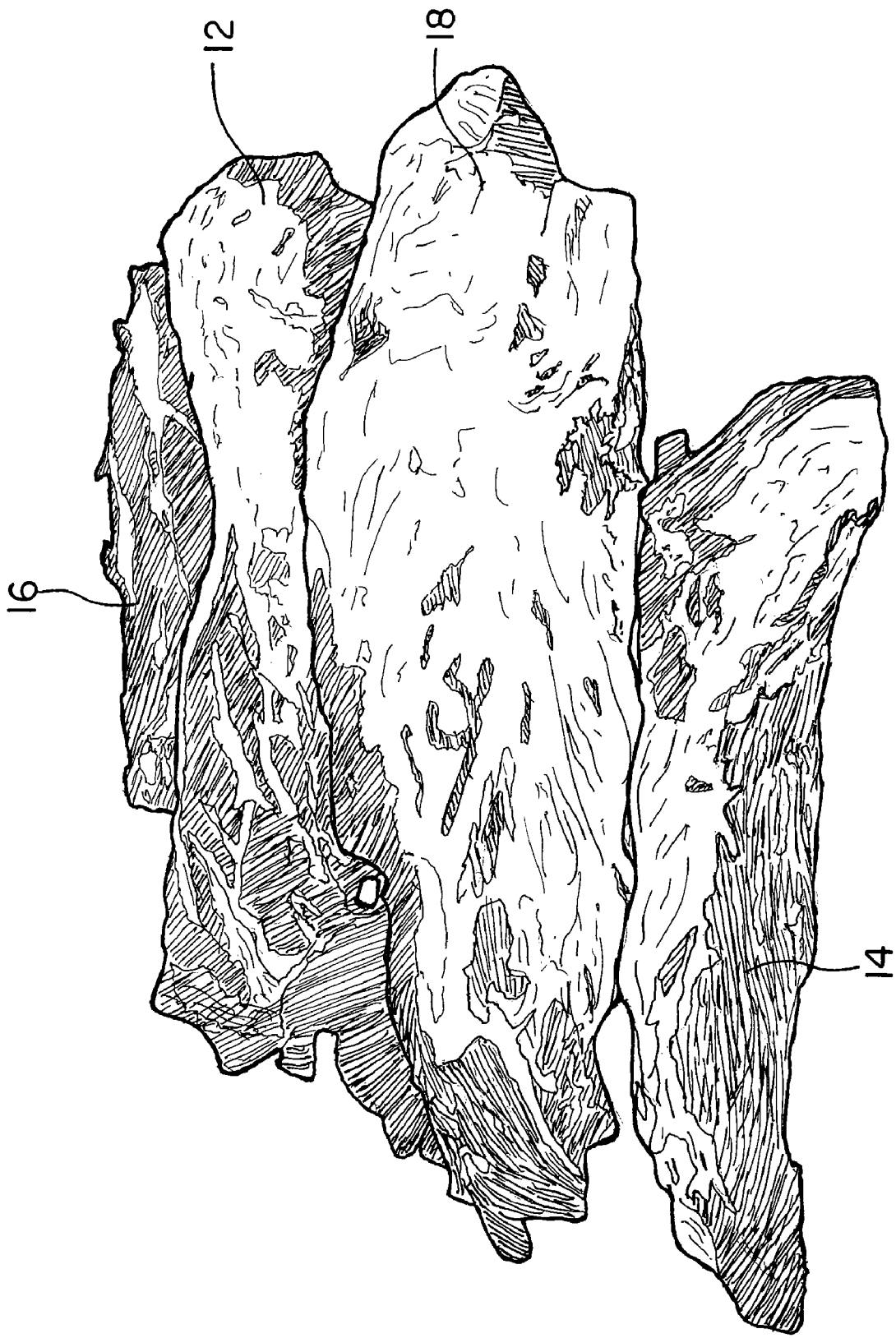
FIG. 6 is a top perspective view of the four separated untrimmed primary muscles of the chuck roll of FIG. 1.
Figure 6A:
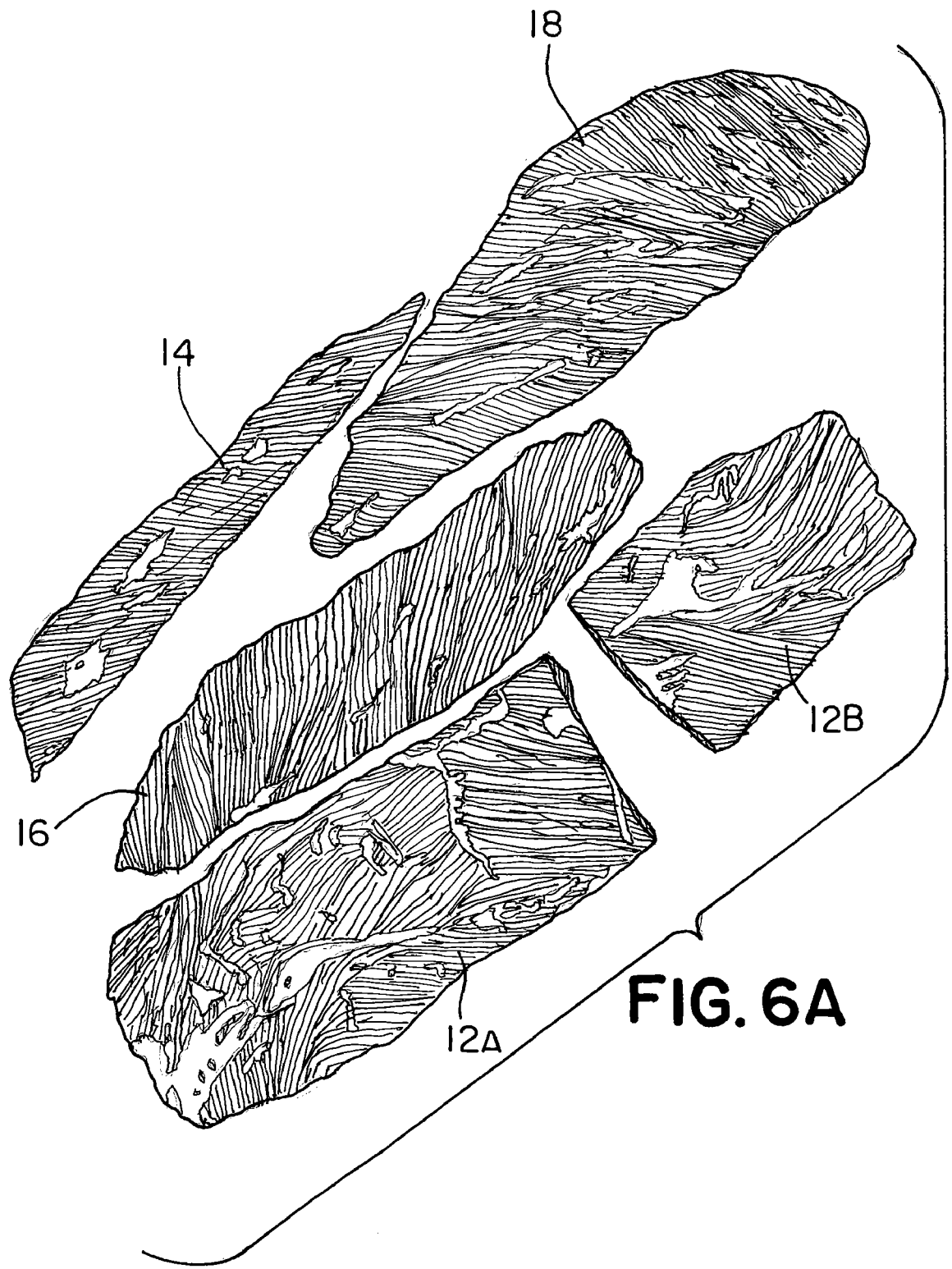
FIG. 6A is a top perspective view of the four separated primary muscles of the chuck roll of FIG. 1 after trimming.
Figure 19:
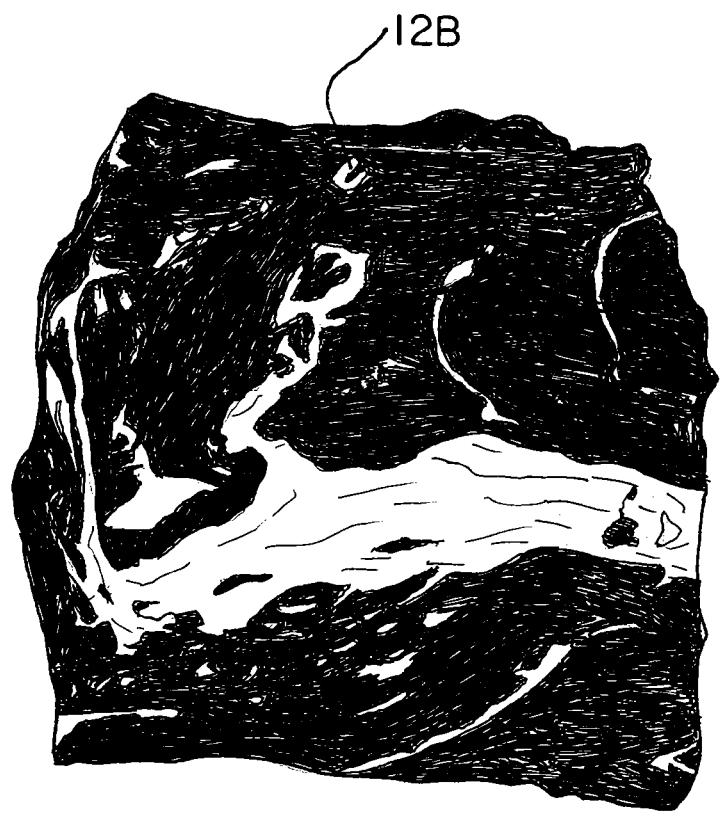
FIG. 19 is a top perspective view of a second, smaller portion of the trimmed first primary muscle.
Figure 20:
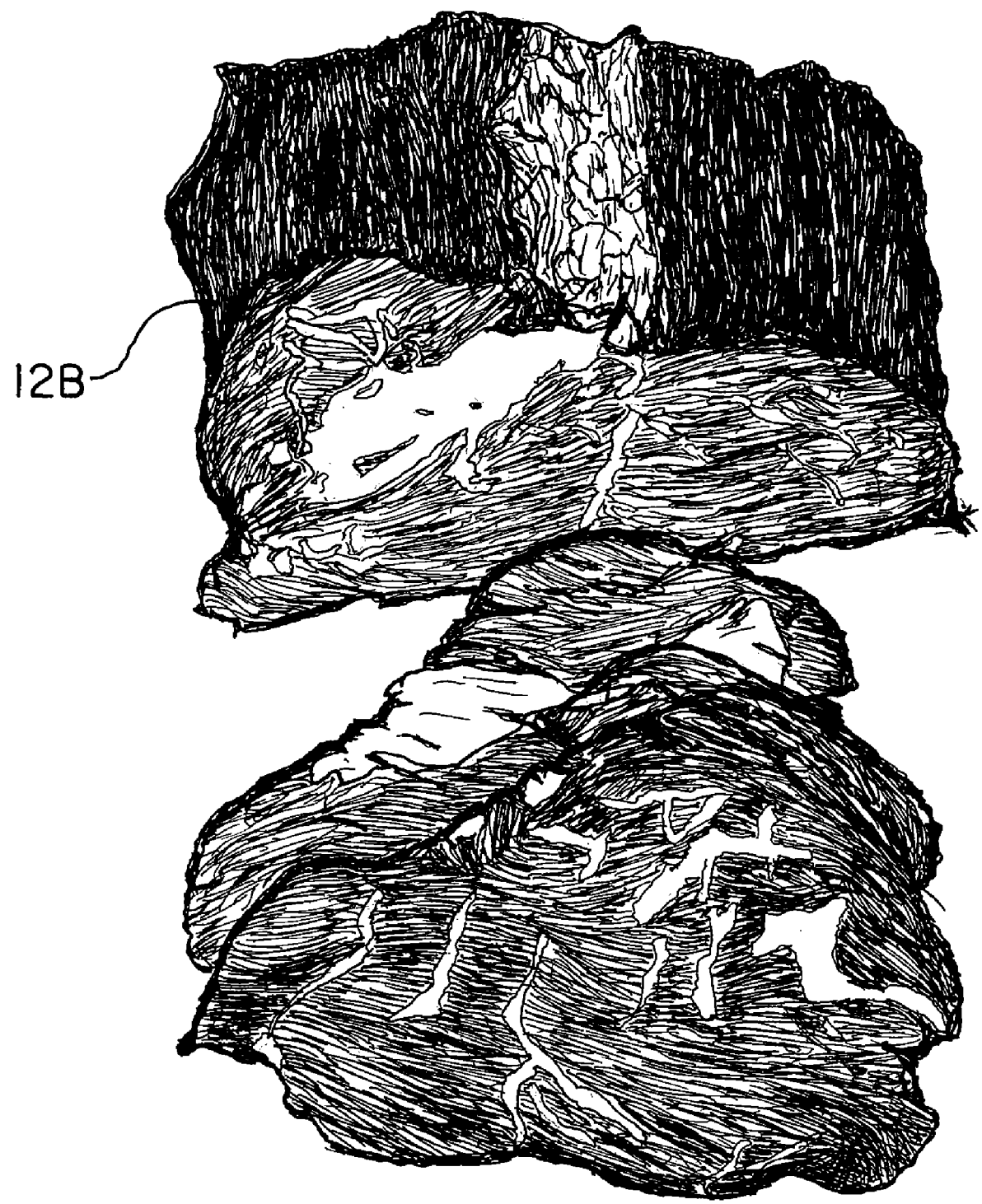
FIG. 20 is a top perspective view of the second portion of the trimmed first primary muscle shown in FIG. 19 after cooking and partial slicing.

Referring now to FIG. 3, the first step in practicing the present method is to remove the first or chuck eye muscle 12 from the remainder of the chuck roll 10 by cutting through the chuck roll 10 along one or more first cut lines 20. The cut(s) may be made using a knife, saw, water knife or any other suitable cutting device. The removed chuck eye muscle 12 is thereafter trimmed and denuded to remove excess fat, seams, silver and other undesirable components to provide a trimmed chuck eye muscle 12 which is then cut into two portions; a first, larger eye portion 12A comprising approximately two thirds of the chuck eye muscle 12 and a second, smaller neck portion 12B comprising about one third of the chuck eye muscle 12 proximate to the neck end as shown in FIG. 6A. The second, smaller, neck portion 12B, after trimming, may be tenderized if desired but is otherwise ready for marketing and cooking as a boneless chuck eye roast product as shown in FIG. 19. The trimmed boneless chuck eye roast product 12B may be roasted, broiled, grilled or cooked in some other manner. FIG. 20 shows the fully cooked chuck eye roast product 12B partially sliced, preferably across the grain, and ready for eating. The price per pound which may be obtained for the chuck eye roast product 12B is substantially more than could be obtained if the second chuck eye muscle portion 12B was to be cut into beef cubes or ground as part of the chuck roll 10 in accordance with the prior art.

Figure 23:
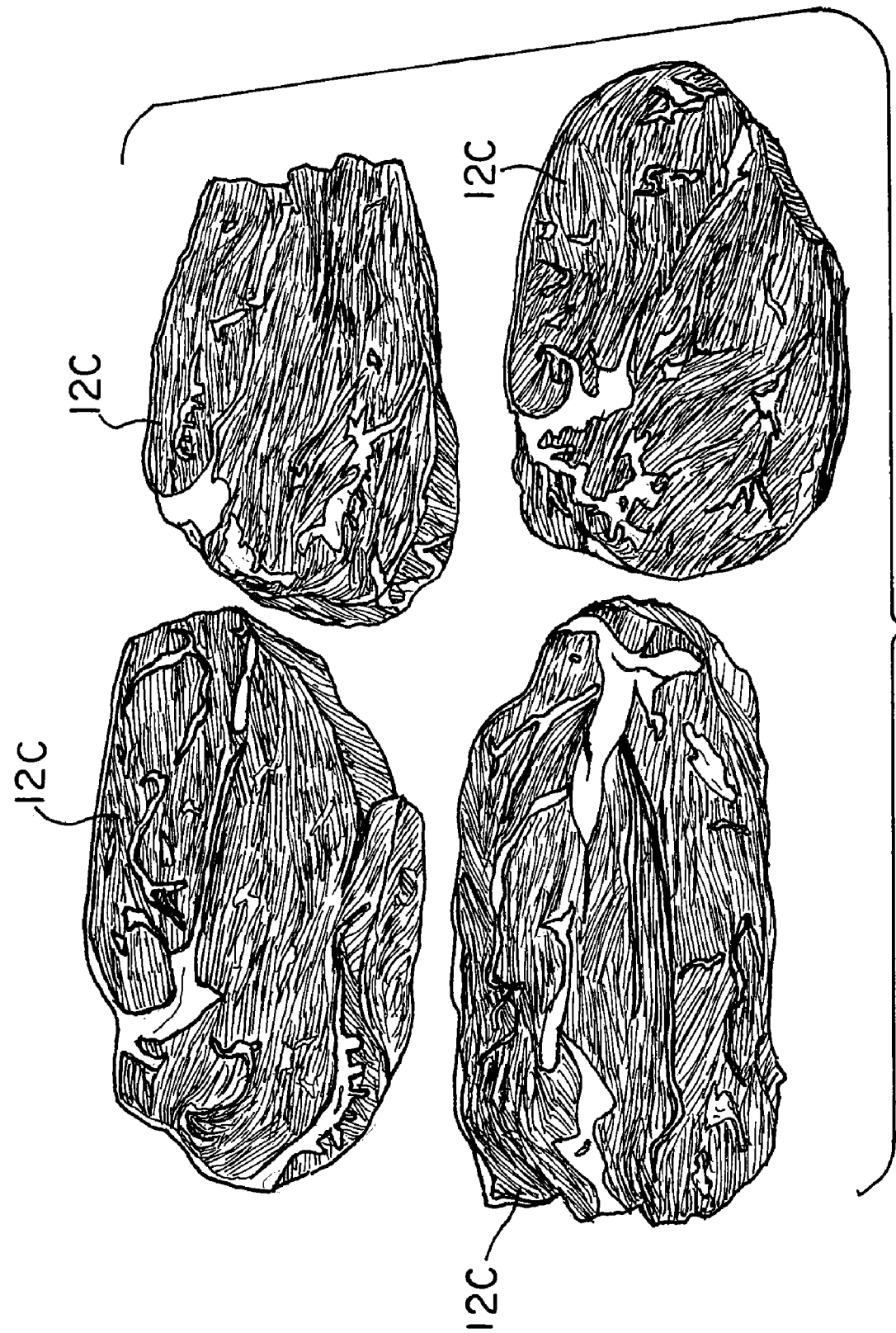
FIG. 23 is a top perspective view of a plurality of steaks which have been made by slicing the trimmed first, larger portion of the first primary muscle.
Figure 24:
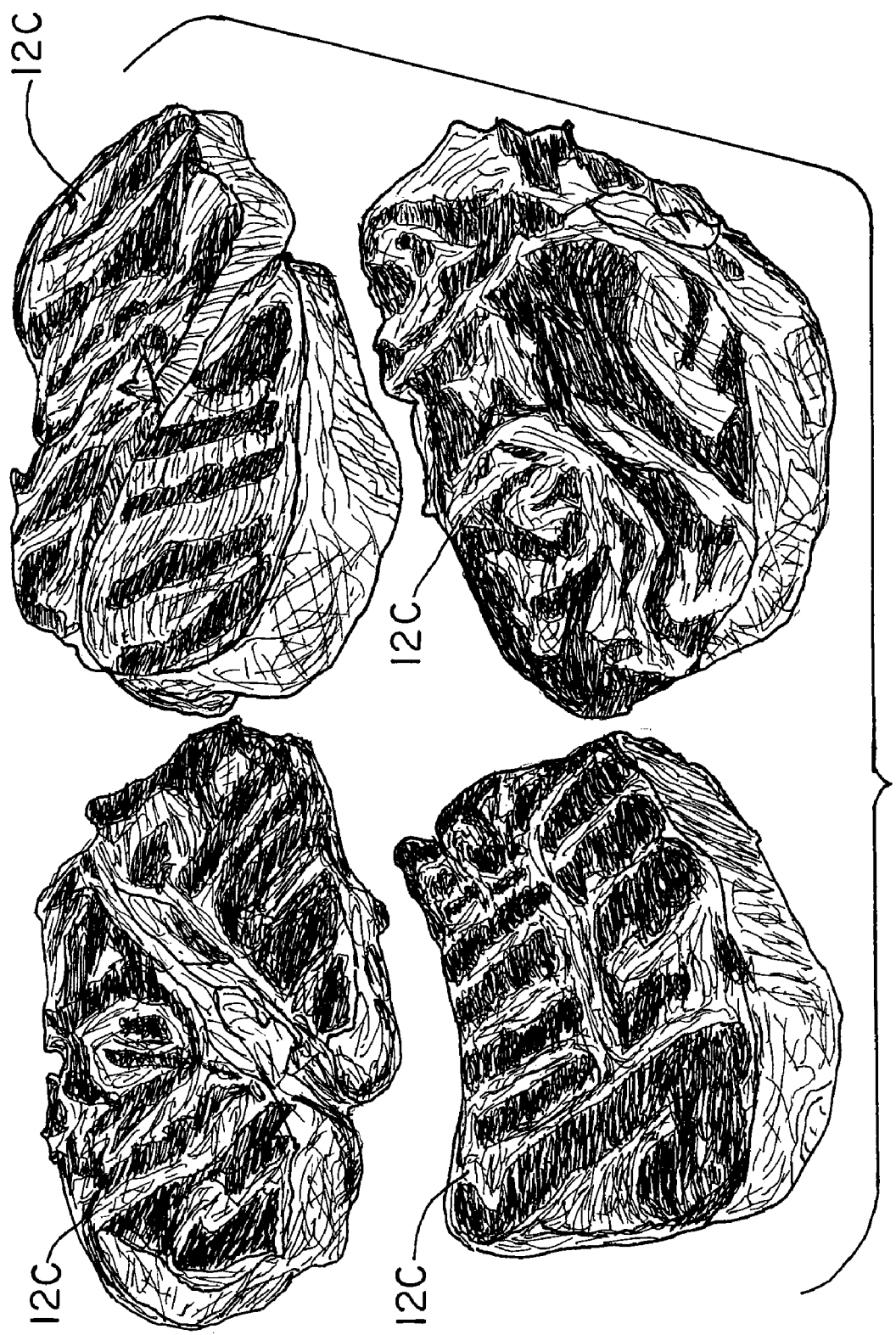
FIG. 24 is a top perspective view of the steaks shown in FIG. 23 after cooking.

The larger, first portion 12A of the chuck eye muscle 12 after trimming, may be tenderized using, for example, a needle tenderizer or some other device or method (not shown). The trimmed (and possibly tenderized) first chuck eye muscle portion 12A shown in FIG. 6A is then cut across the grain, along a series of spaced apart cut lines extending generally parallel to each other to form a plurality of chuck eye steaks 12C as shown in FIG. 23. The cuts may be made using a knife, saw, water knife or any other suitable cutting device. The cuts are in the range of one half of an inch to two inches apart and preferable are about one half of an inch apart to provide chuck eye steaks 12C which are about one half of an inch thick. The chuck eye steaks 12C are healthy because they are low in fat and high in protein. The price per pound which may be obtained for the chuck eye steaks 12C is substantially more than could be obtained if the first chuck eye muscle portion 12A was to be cut into beef cubes or ground as part of the chuck roll 10 in accordance with the prior art. The chuck eye steaks 12C may be grilled, broiled or cooked in some other manner as shown in FIG. 24.

Figure 4:
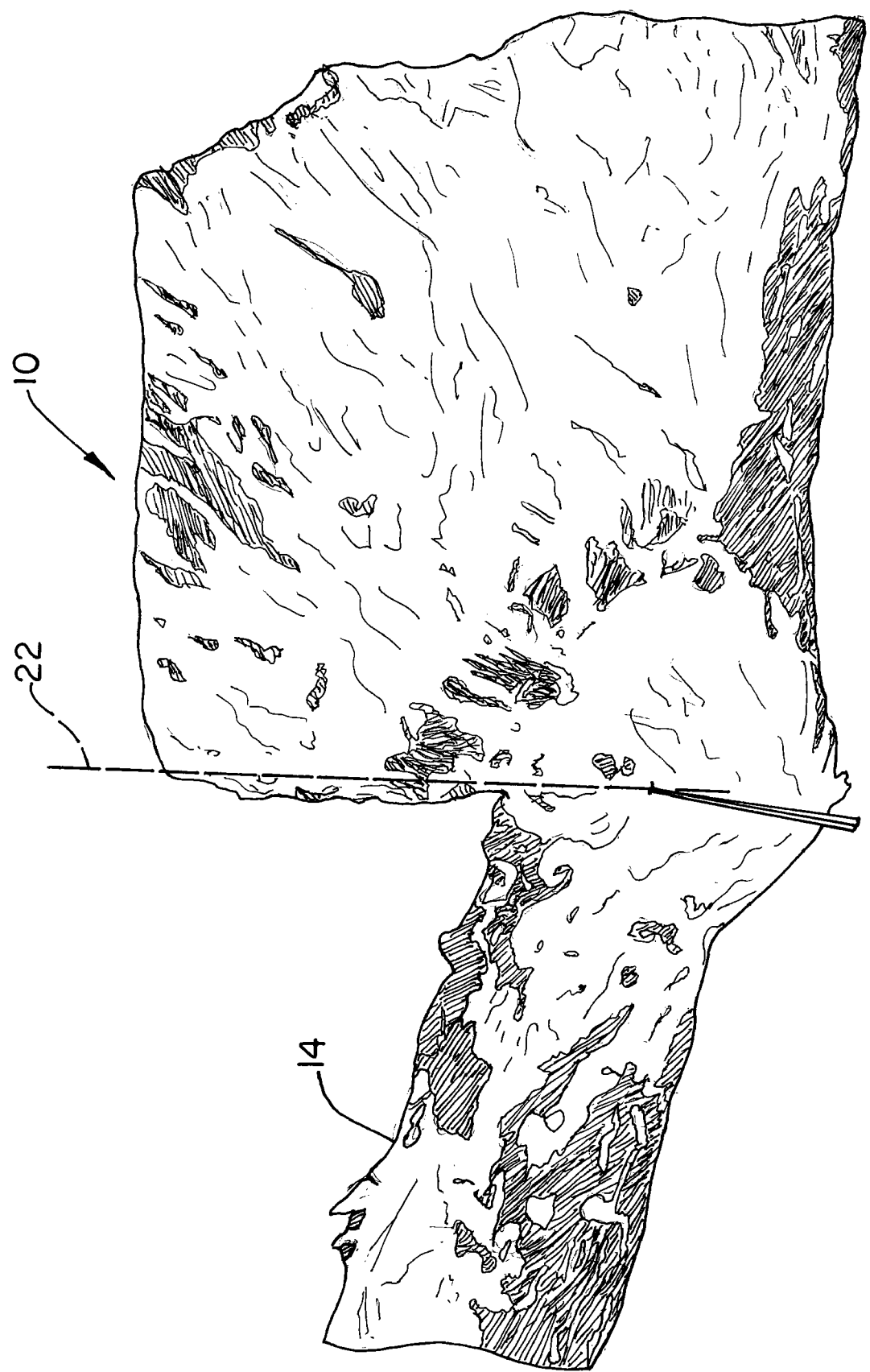
FIG. 4 is a top perspective view of the chuck roll shown in FIG. 3 after removal of the first primary muscle and illustrating a second step in cutting the chuck roll to remove a second primary muscle in accordance with the present method.
Figure 7:
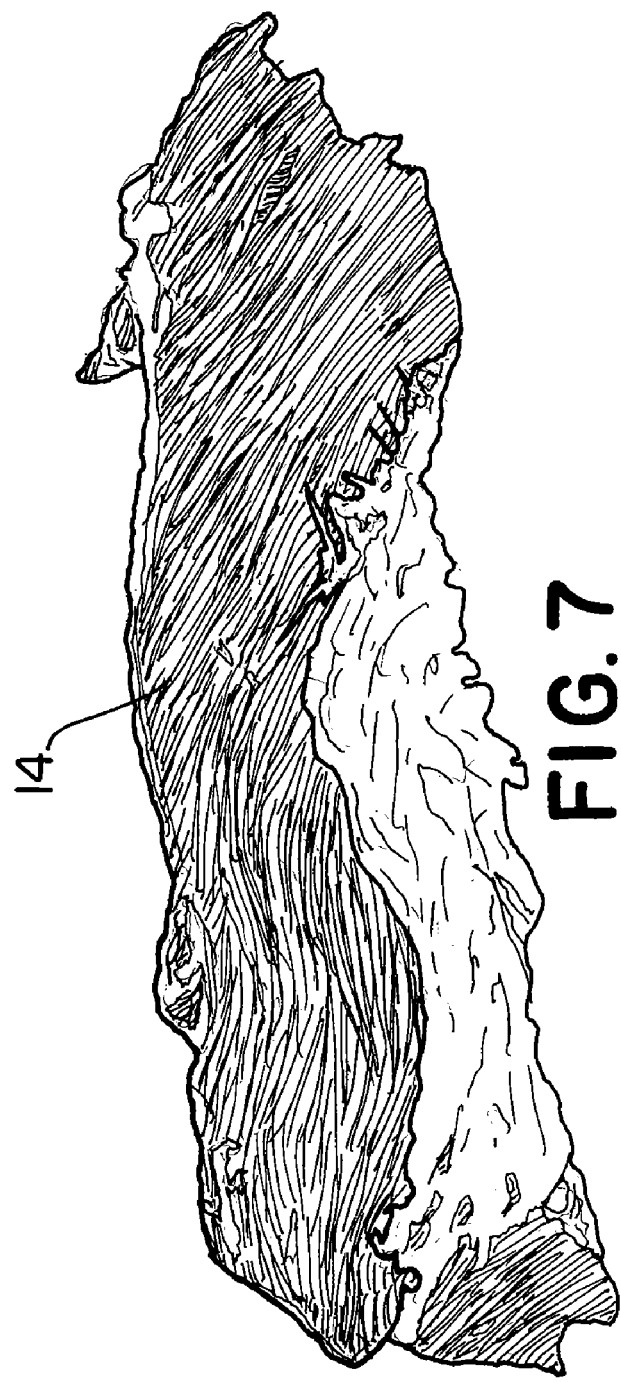
FIG. 7 is a top perspective view of the removed untrimmed second primary muscle.
Figure 8:
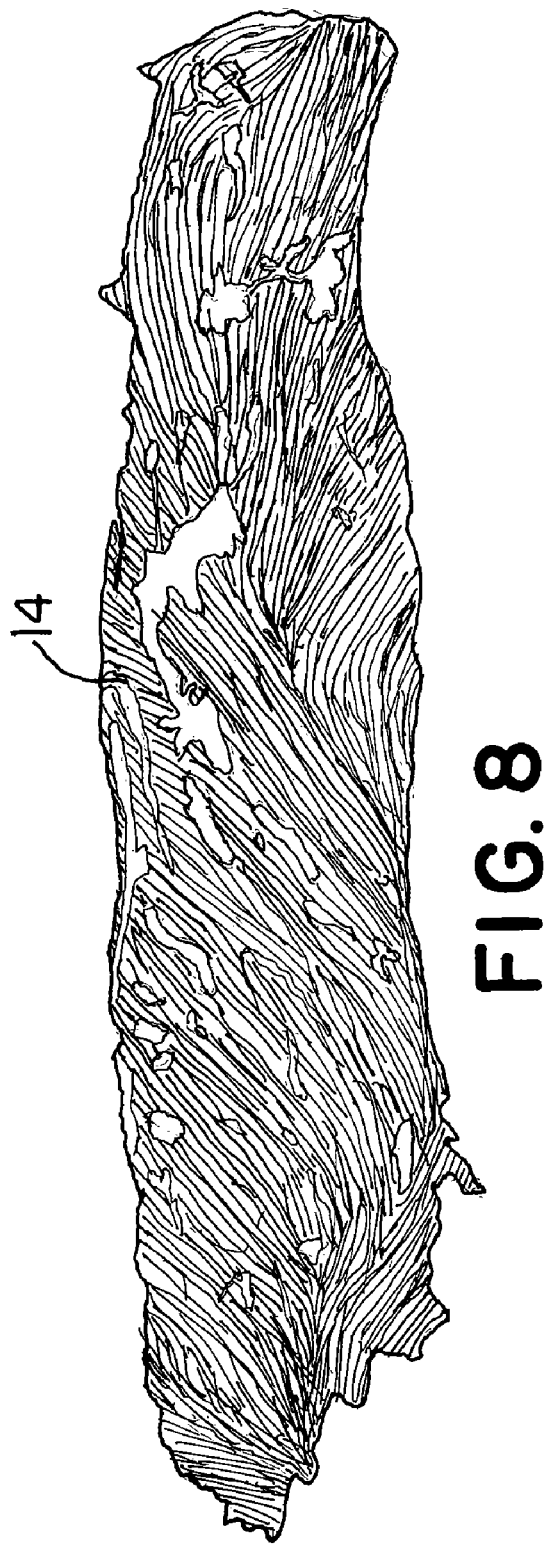
FIG. 8 is a top perspective view of the second primary muscle after trimming in accordance with the present method.
Figure 9:
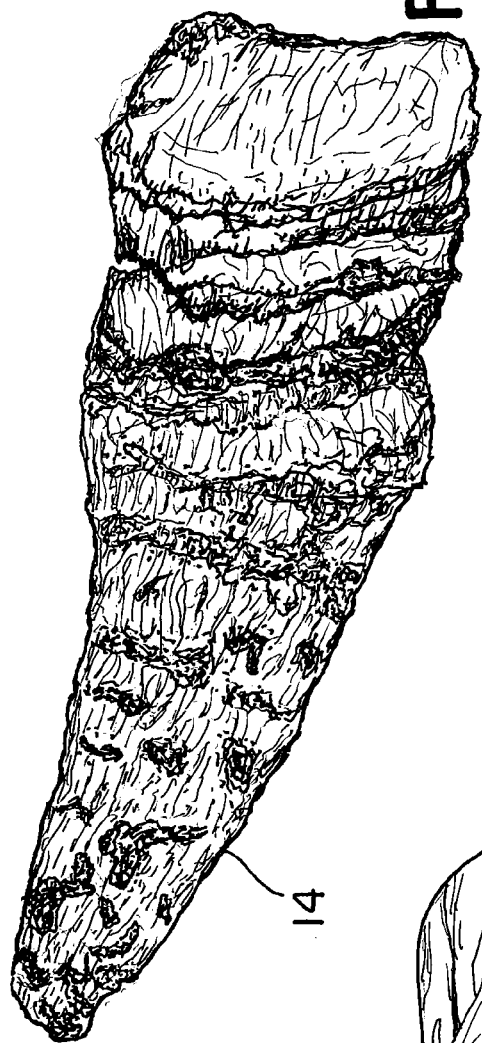
FIG. 9 is a top perspective view of the trimmed second primary muscle after cooking and slicing in accordance with the present method.
Figure 10:
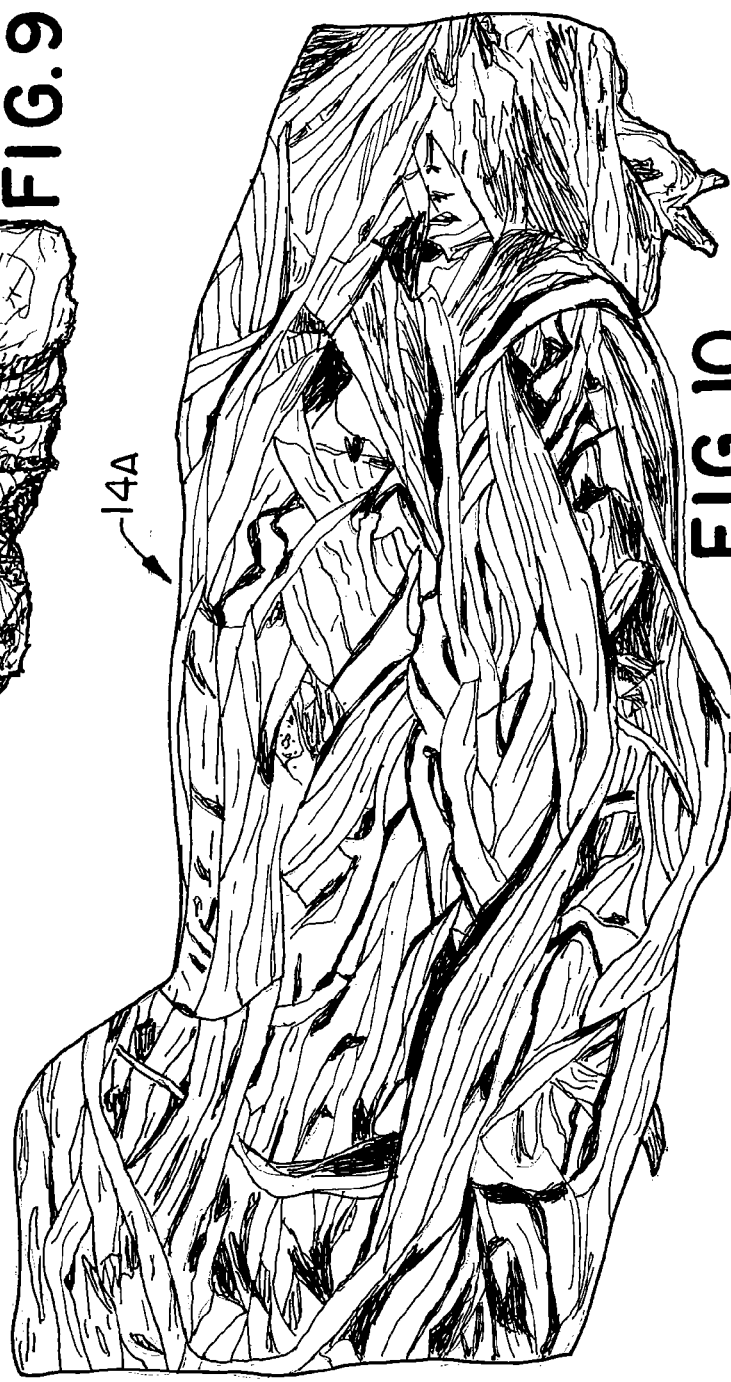
FIG. 10 is a top perspective view of the trimmed second primary muscle after cooking and being "pulled" in accordance with the present method.

The next step in practicing the present method is to remove the second or rhomboideus (hump) muscle 14 from the remainder of the chuck roll 10 by cutting through the chuck roll 10 along one or more second cut lines 22 as shown in FIG. 4. The cut(s) may be made using a knife, saw, water knife or any other suitable cutting device. The removed untrimmed rhomboideus muscle 14 shown in FIGS. 6 and 7 is then trimmed and denuded to remove excess fat, seams, silver and other undesirable components and may be tenderized using, for example, a needle tenderizer or some other device or method (not shown). The trimmed (and possibly tenderized) rhomboideus muscle 14 shown in FIGS. 8 and 6A is a new beef product which is low in fat and high in beef flavor and texture. The price per pound which may be obtained for the trimmed rhomboideus muscle product 14 is substantially more than could be obtained if the rhomboideus muscle 14 was to be cut into beef cubes or ground as part of the chuck roll 10 in accordance with the prior art. The trimmed (and possibly tenderized) rhomboideus muscle product 14 shown in FIG. 8 is ready for cooking. The trimmed rhomboideus muscle product 14 may be roasted, broiled, grilled or cooked in some other manner and may thereafter be sliced, preferably across the grain, like a roast as shown in FIG. 9. Alternatively, after cooking, the trimmed rhomboideus muscle product 14 may be "pulled" in a known manner to provide a pulled beef product 14A as shown in FIG. 10.

Figure 5:
FIG. 5 is a top perspective view of the chuck roll of FIG. 4 after removal of the first and second primary muscles and illustrating separating the third and fourth primary muscles.
Figure 11:
FIG. 11 is a top perspective view of the removed untrimmed third primary muscle.
Figure 12:
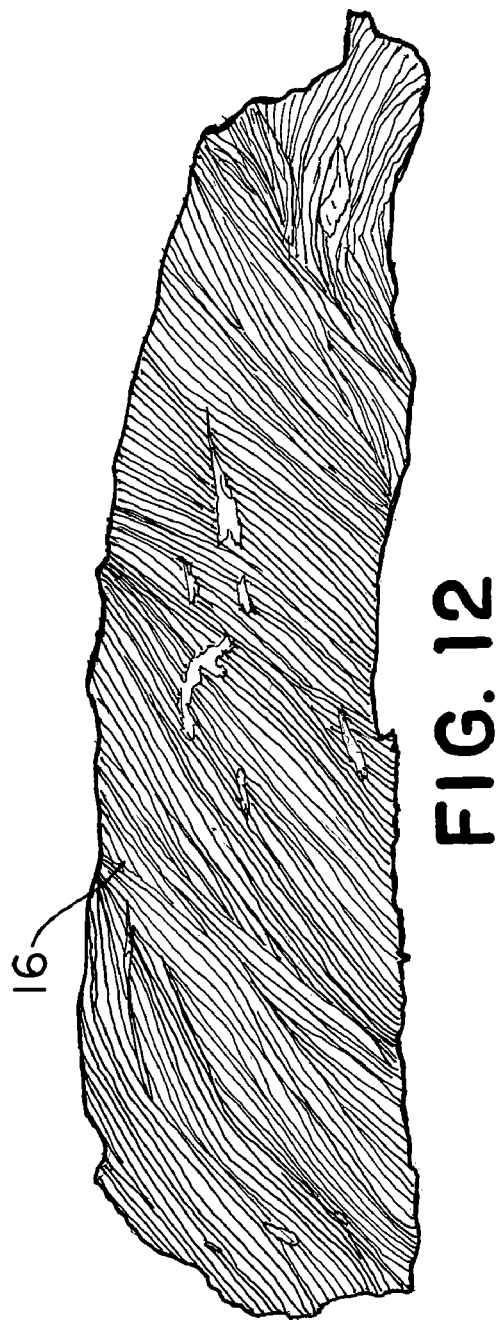
FIG. 12 is a top perspective view of the third primary muscle after trimming in accordance with the present method.
Figure 13:
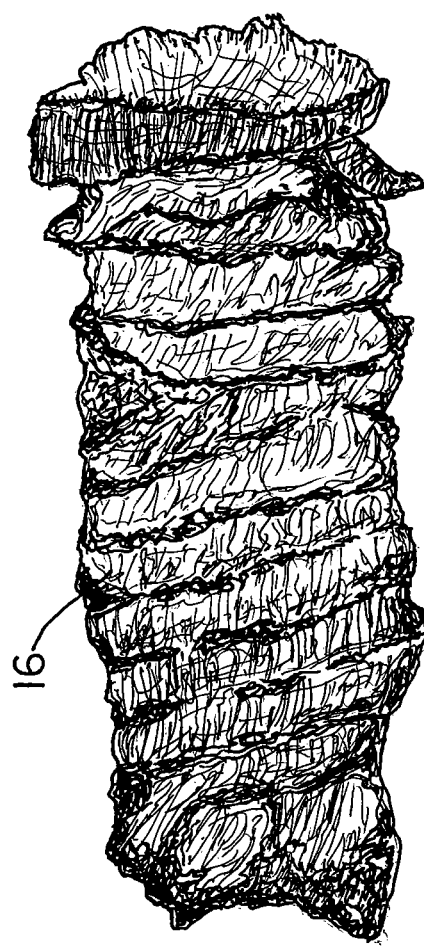
FIG. 13 is a top perspective view of the trimmed third primary muscle after cooking and slicing in accordance with the present method.
Figure 14:
FIG. 14 is a top perspective view of the trimmed third primary muscle after cooking and being "pulled" in accordance with the present method.

The next step in practicing the present method is the removal of the third or splenius muscle 16 by cutting along one or more third cut lines 24 to separate the splenius muscle 16 from the fourth or serratus ventralis muscle 18 as shown in FIG. 5. The cut(s) may be made using a knife, saw, water knife or any other suitable cutting device. The removed untrimmed splenius muscle 16 shown in FIGS. 6 and 11 is then trimmed and denuded to remove excess fat, seams, silver and other undesirable components and may be tenderized using, for example, a needle tenderizer or some other device or method (not shown). The trimmed (and possibly tenderized) splenius muscle 16 shown in FIGS. 12 and 6A is a new beef product which is low in fat and high in beef flavor and texture. The price per pound which may be obtained for the trimmed splenius muscle product 16 is substantially more than could be obtained if the splenius muscle 16 was to be cut into beef cubes or ground as part of the chuck roll 10 in accordance with the prior art. The trimmed (and possibly tenderized) splenius muscle product 16 shown in FIG. 12 is ready for cooking. The trimmed splenius muscle product 16 may be roasted, broiled, grilled or cooked in some other manner and may thereafter be sliced, preferably across the grain, like a roast as shown in FIG. 13. Alternatively, after cooking, the trimmed splenius muscle 16 may be "pulled" in a known manner to provide a pulled beef product 16A as shown in FIG. 14.

Figure 17:
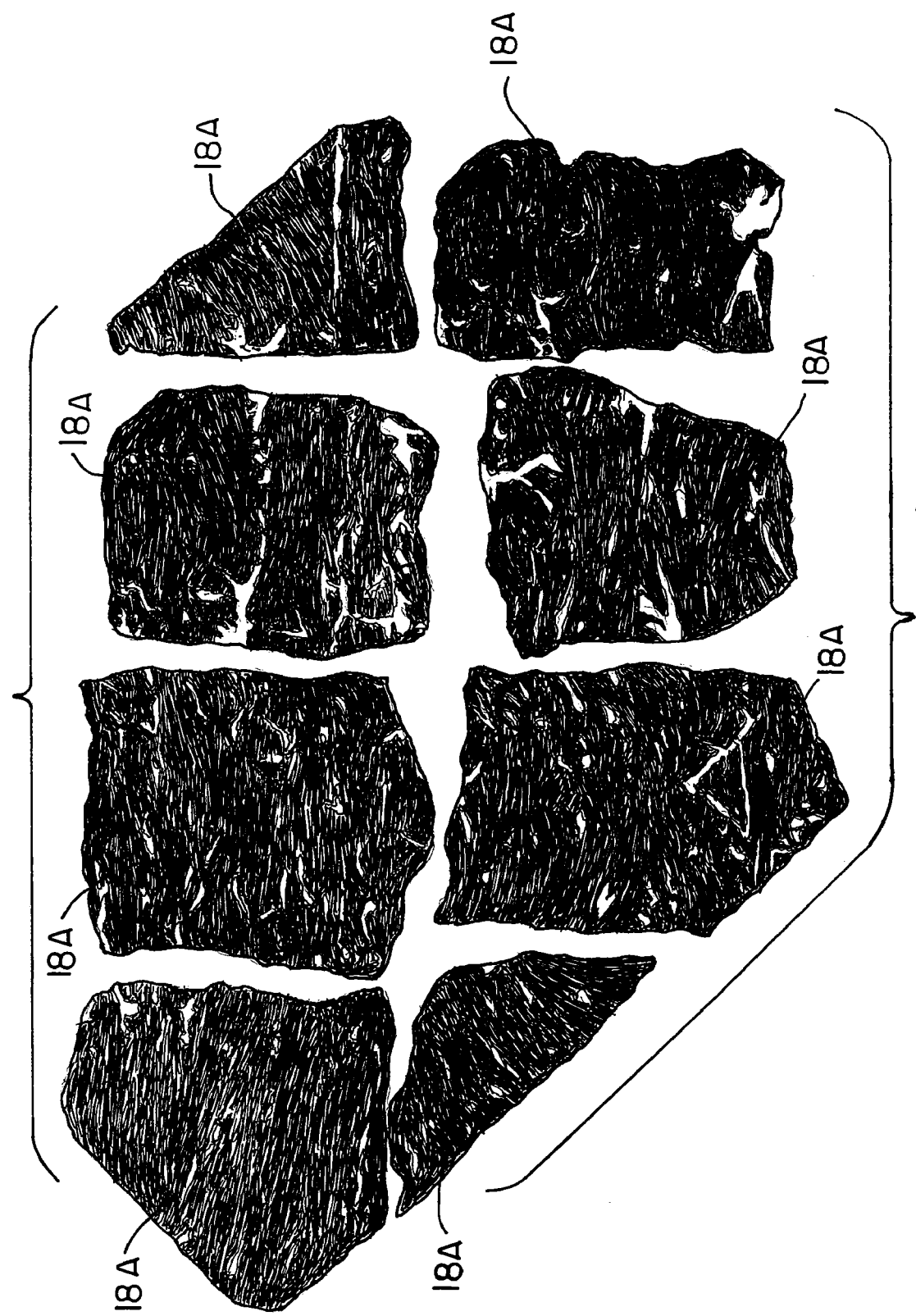
FIG. 17 is a top perspective view of a plurality of steaks which have been made by slicing the trimmed fourth primary muscle shown in FIG. 16.
Figure 18:
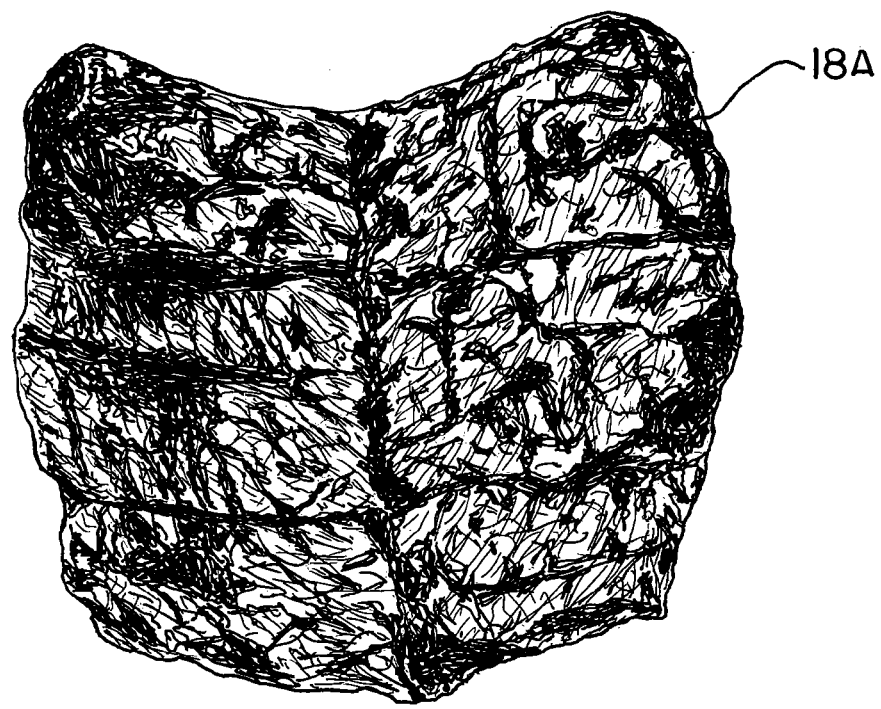
FIG. 18 is a top perspective view of one of the steaks shown in FIG. 17 after butterflying and cooking.

In the next step in practicing the present method, the removed serratus ventralis muscle 18 shown in FIGS. 6 and 15 is trimmed and denuded to remove excess fat, seams, silver and other undesirable components and may be tenderized using, for example, a needle tenderizer or some other device or method (not shown). The trimmed (and possibly tenderized) serratus ventralis muscle 18 shown in FIGS. 16 and 6A is then cut across the grain, along a series of spaced apart cut lines extending generally parallel to a fourth cut line 26 to form a plurality of chuck steaks 18A which are thereafter butterflied as shown in FIG. 17. The cuts may be made using a knife, saw, water knife or any other suitable cutting device. The cuts are in the range of one to two inches apart and preferable are about one inch apart to provide chuck steaks 18A which after being butterflied are preferably about one half inch thick. The chuck steaks 18A are healthy because they are low in fat and high in protein. The price per pound which may be obtained for the chuck steaks 18A is substantially more than could be obtained if the serratus ventralis muscle 18 was to be cut into beef cubes or ground as part of the chuck roll 10 in accordance with the prior art. The chuck steaks 18A may be grilled, broiled or cooked in some other manner as shown in FIG. 18.

Figure 21:
FIG. 21 is a top perspective view of the trimmings which have been removed from the chuck roll and the various primary muscles.
Figure 22:
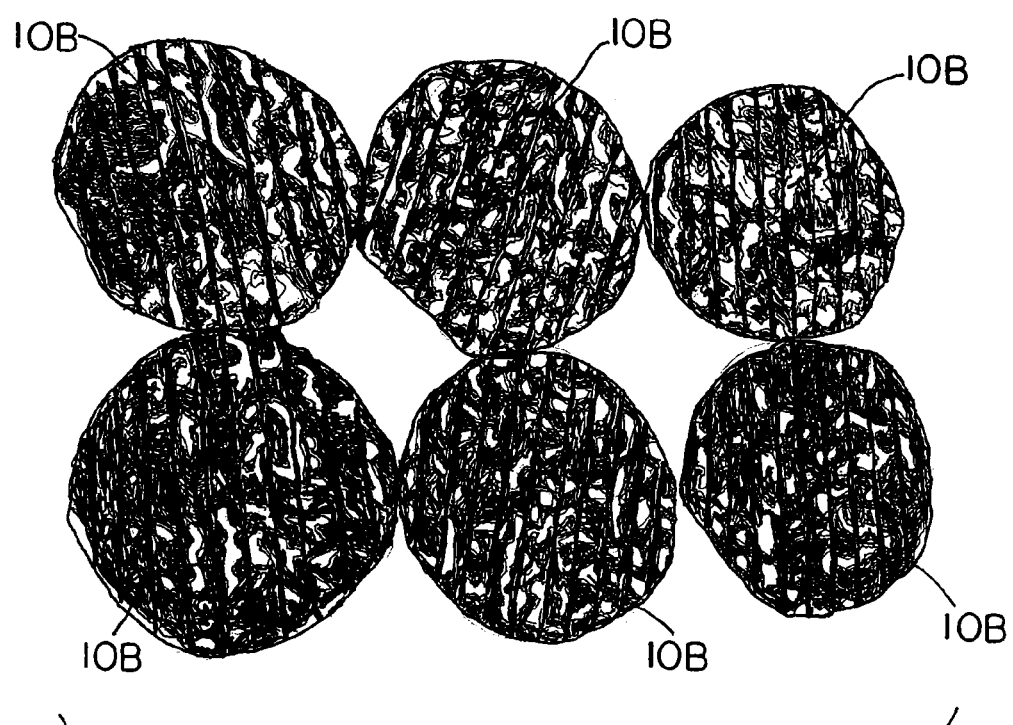
FIG. 22 is a top perspective view of a plurality of beef burgers which have been made from the trimmings shown in FIG. 21.

FIG. 21 shows all of the usable "trim" 10A which has been removed from the chuck roll 10 and the various primary muscles 12, 14, 16 and 18 as a result of the above described steps. The trim 10A may be ground in any known manner and formed into a plurality of chuck beef burgers 10B as shown in FIG. 22. Thus, there is very little waste when employing the above described method for cutting a beef chuck roll 10.

From the foregoing, it can be seen that the present invention comprises a method of cutting a beef chuck roll into new high value beef products having little or no waste. The new beef products 12C, 12B, 14, 14A, 16, 16A, and 18A are all high in protein, low in fat and, with the possible exception of the chuck beef burgers 10B, are marketed for a higher price per pound than that of the traditional chuck roll 10. It will be appreciated by those skilled in the art that changes could be made to the embodiment described above without departing from the broad inventive concepts thereof. It is understood, therefore, that this invention is not limited to the particular embodiment disclosed, but it is intended to cover all modifications within the spirit and scope of the present invention in accordance with the appended claims.

The invention claimed is:

1. A method of cutting a beef chuck roll to provide a plurality of higher value beef products comprising the steps of:
   cutting the chuck roll along at least three cut lines to separate the chuck roll into four primary muscles, a first or eye muscle, a second or rhomboideus muscle, a third or splenius muscle and a fourth or serratus ventralis muscle;
   trimming each of the four primary muscles to remove excess fat, seams, silver and other undesirable components;
   cutting the eye muscle into first and second portions, the second portion being marketed as a boneless chuck eye roast product;
   cutting the first portion of the eye muscle along a plurality of generally parallel spaced apart cut lines extending generally across the grain of the first portion to form a plurality of low fat, boneless chuck eye steaks;
   marketing the rhomboideus and splenius muscles as boneless roast products; and
   cutting the serratus ventralis muscle along a plurality of generally parallel spaced apart cut lines extending generally across the grain of the serratus ventralis muscle to form a plurality of low fat, boneless chuck steaks.

2. The method as recited in claim 1 wherein at least one of the muscles is tenderized.

3. The method as recited in claim 1 wherein the second and third muscles are each tenderized.

4. A beef product made in accordance with the method of claim 3.

5. The method as recited in claim 1 wherein the distance between the cut lines made in the serratus ventralis muscle is in the range of one to two inches.

6. The method as recited in claim 5 wherein the chuck steaks made from the serratus ventralis muscle are each butterflied.

7. The method as recited in claim 5 wherein the serratus ventralis muscle is tenderized prior to being cut into the steaks.

8. A beef product made in accordance with the method of claim 7.

9. A beef product made in accordance with the method of claim 5.

10. The method as recited in claim 1 wherein the second portion of the eye muscle is tenderized.

11. The method as recited in claim 1 wherein at least a portion of the components trimmed from the four primary muscles is ground and is formed into beef chuck burgers.

12. Beef products made in accordance with the method of claim 1.

* * * * *